UNITED STATES PATENT OFFICE.

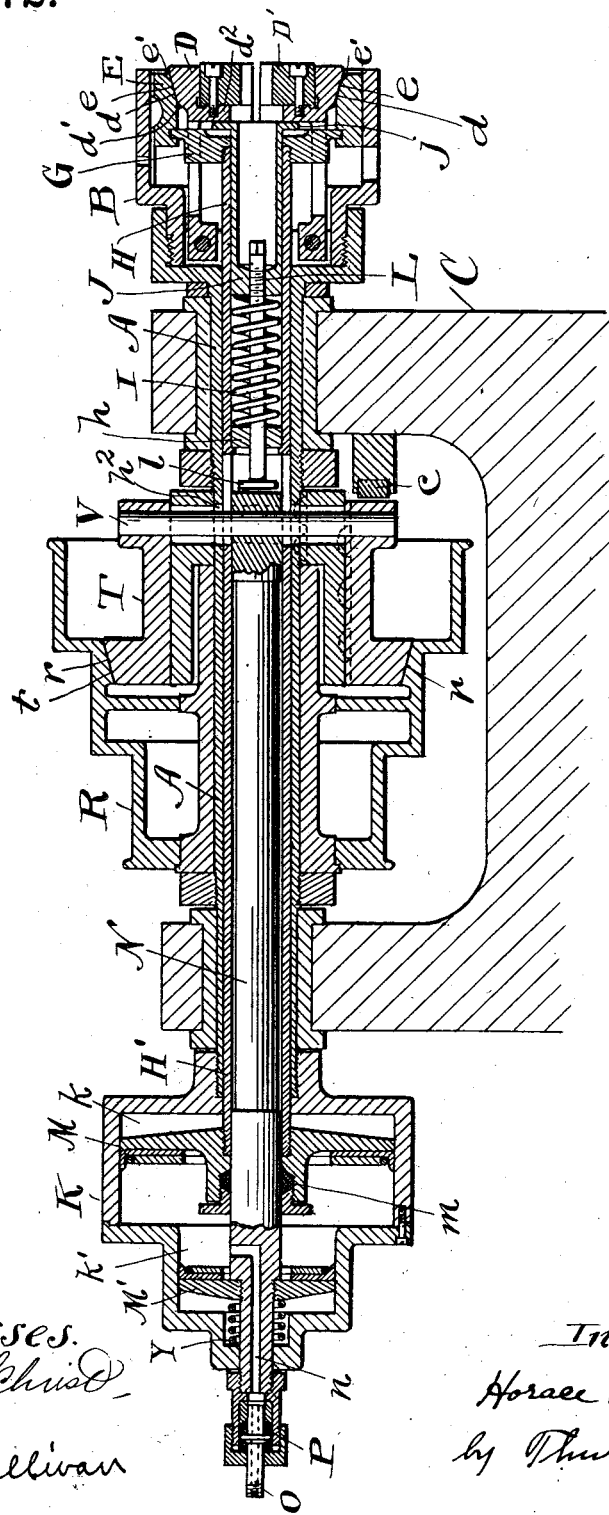

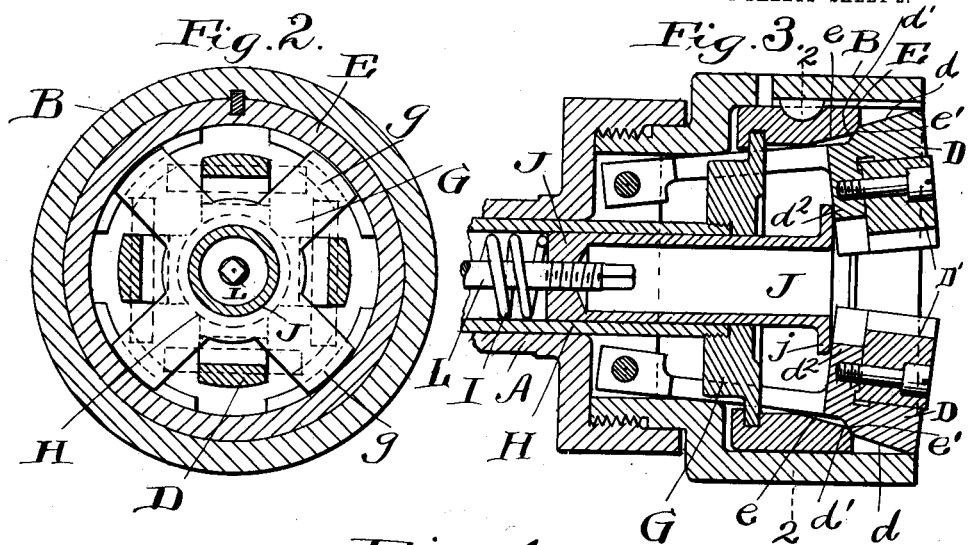
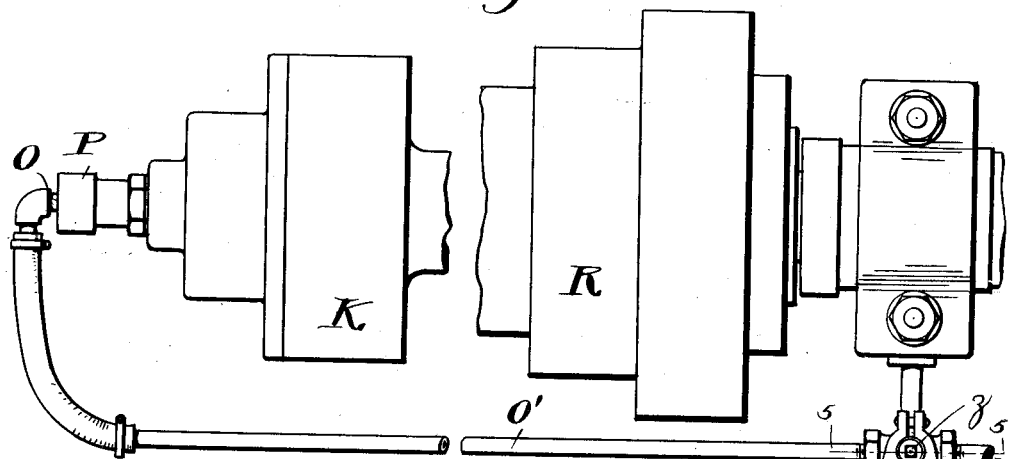
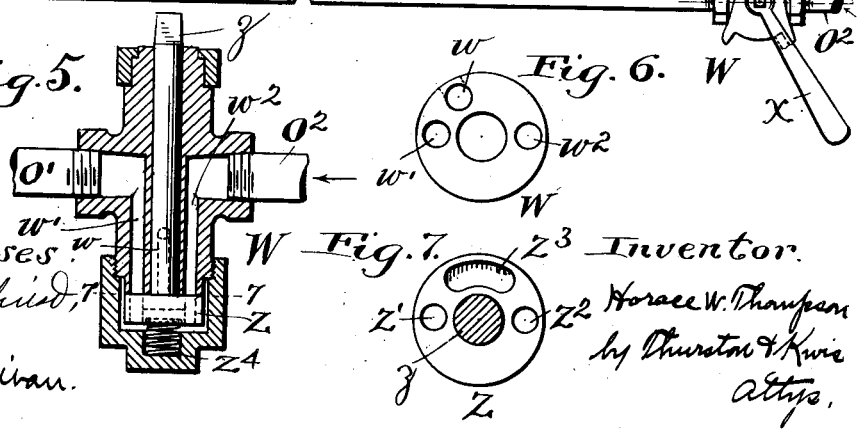

HORACE W. THOMPSON, OF EAST CLEVELAND, OHIO, ASSIGNOR TO BARDONS AND OLIVER, A PARTNERSHIP COMPOSED OF GEORGE C. BARDONS AND JOHN G. OLIVER, BOTH OF CLEVELAND, OHIO.

CHUCK MECHANISM.

1,118,072.  Specification of Letters Patent. Patented Nov. 24, 1914.

Application filed June 16, 1910. Serial No. 567,150.

*To all whom it may concern:*

Be it known that I, HORACE W. THOMPSON, a citizen of the United States, residing at East Cleveland, in the county of Cuyahoga and State of Ohio, have invented a certain new and useful Improvement in Chuck Mechanism, of which the following is a full, clear, and exact description.

This invention relates to improvements in chuck mechanism for lathes, the object being to provide an efficient chuck, together with means for quickly and easily closing and opening the chuck jaws, and for starting the spindle after the chuck jaws are closed and for stopping the spindle before they are opened.

The invention, embodied in the best form known to me, is shown in the accompanying drawings and is described and defined in the following specification and claims.

In the drawing, Figure 1 is a central longitudinal vertical section of the live spindle of a lathe equipped with this invention. Fig. 2 is a transverse sectional view in the plane indicated by line 2—2 on Fig. 3. Fig. 3 is a similar view of the front end, the head of said spindle and the chuck mechanism therein, said mechanism being shown with the chuck jaws in the wide open position. Fig. 4 is a plan view of a part of said mechanism showing particularly the means for controlling the admission of compressed air to the device for operating the same. Fig. 5 is a longitudinal sectional view in the plane of line 5—5 on Fig. 4, showing the valve preferably employed in connection with the described mechanism. Fig. 6 is a bottom view of the valve casing; and Fig. 7 is a sectional view of the valve in the plane indicated by line 7—7 on Fig. 5.

Referring to the parts by letters, A represents the tubular live spindle of a lathe; which spindle is rotatably mounted in frame member C. A hollow cylindrical head B is fixed, *i. e.*, screwed on the front end of this spindle. Four, more or less, chuck jaws D are within, and are pivoted at their rear ends to this head. On the outer face of each chuck jaw are two inclined faces $d$, $d'$, which are inclined at different angles, as shown.

E represents the jaw closing ring which is located within the head B. It may move longitudinally therein, but must rotate with it, because it has a tongue and groove connection with the head. The inner face of this ring near its front end is beveled at $e$ on an incline corresponding with the inclination of the inclined surfaces $d$ on the jaws. Very close to the front end of this collar is another differently inclined surface $e'$, the inclination of which corresponds with the inclination $d'$ on the chuck jaws. It is obvious that by moving this collar from the position such, for example, as shown in Fig. 3, in which the jaws are wide open, toward the front end of the head, the beveled surface $e'$ by its engagement with the beveled surfaces $d'$ on the several chuck jaws will move them inwardly. By still further moving the collar forward the beveled surface $e$ thereon will engage with the beveled surfaces $d$ on the chuck jaws and still further close said jaws.

G represents a spider which is located within the head, and is fixed to the front end of a tube H slidably fitted within the tubular live spindle. The arms $g$ of this spider enter grooves in the inner periphery of the collar E near its rear end thus forming a swivel connection therewith. A tubular cylindrical rod J is slidably fitted in the front end of the tube H, and it has an outwardly extended flange $j$ which engages with arms $d^2$ which project from the chuck jaws toward the axis of the spindle. In the rear end of the tube H is a plug $h$, between which and the rear end of the member J a coil spring I is compressed. This spring tends to push the tube H rearward and the member J forward when tube H is permitted to so move. When it does so move, it draws the spider G rearward, and the spider draws the collar E rearward thus permitting the jaws to open. At the same time the member J moves forward, and as its flange presses against the arms $d^2$ the jaws are positively swung outward as far as may be. A tube H' is also fitted in the live spindle. Its front end abuts the rear end of the tube H. Its rear end extends into a cylindrical piston chamber $k$ in the member K which is fixed to the rear end of the live spindle. A piston M located in this piston chamber is fixed to the rear end of the tube H'. A rod N is slidably fitted in the tube H', and passes through a stuffing box $m$ in the piston M. The rear part of the piston chamber $k'$ is of smaller diameter than the front part thereof. A second piston M' which is fitted to the rear part of the said piston chamber is fixed to the rod N. The rod N passes through the rear end of the head $k$, and contains a port $n$ leading from its end to the space in chamber $k$ between the two pistons. On the rear end of this rod N is a stuffing box connection P through which projects a supply pipe O, by means of which compressed air may be delivered into port $n$.

Loosely rotating upon the live spindle is a cone pulley R having a conical friction clutching surface $r$. Embracing and slidably mounted upon the live spindle is the clutch sleeve T, having at its rear end a conical clutching surface to oppose the conical surface $r$. A pin V passes through a slot $h^2$ in the live spindle and the tube H' respectively and through the rod N, and into the clutch sleeve T; wherefore this clutch sleeve T, the live spindle, the tube H' and the rod N must all rotate in unison, but nevertheless the rod N and the clutch sleeve T are permitted to move together longitudinally, relative to the other parts. The front end of the clutch sleeve is adapted to serve as a brake surface for engagement with a brake pad $c$ fixed to the frame member C.

If now compressed air be admitted through pipe O into the space between the two pistons M and M', they will be moved in opposite directions,—that is to say, piston M will be driven forward and piston M' will be driven rearward. The rearward movement of the piston M' acting on the rod N will move the clutch sleeve T out of engagement with the brake surface $c$ and into frictional engagement with the cone pulley R which was, before that time, rotating idly upon the live spindle. This connects the live spindle and pulley, whereupon the former is rotated. The forward movement of the piston M will force the tube H' forward. The end of this tube pressing against the end of the tube H will force it forward, thereby moving spider G and collar E forward with the result of closing the clutch jaws D upon the work which has been placed in proper position to be grasped by them. Preferably, supplemental chuck jaws D' of proper shape are fixed to the front end of the clutch jaws D. When the work grasped by said jaws has been finished air is allowed to escape from the chamber between the two pistons. Thereupon a spring Y compressed behind piston M' within the head K forces said piston and the member N forward, which movement carries the clutch sleeve T forward at once disconnecting the cone pulley R from the live spindle, and brings the front end of said clutch sleeve against the braking surface $c$ whereby the live spindle, and in fact all of the parts except the cone pulley are checked and ultimately stopped in their rotation. At the same time the spring I is permitted to act and does act with the result, as before stated, of pushing the sleeve H and consequently the sleeve H' and piston M rearward. The spider G and collar E are thereby drawn rearward and the chuck jaws D are permitted to open. This spring I also pushes the member J forward so that its flange $j$ by engaging with the arms $d^2$ of the chuck jaws positively opens them. A rod L goes loosely through the plug $h$, and is screwed through the rear end of the tubular rod J, and its front end is squared so that it may be turned by a socket wrench passed into the inner end. On the rear end of rod L is a head $l$, which by engagement with plug $h$ will limit the relative movement of sleeve H and member J. The extent to which the jaws D may be opened may therefore be varied by the turning of this rod L. Of course, the latter part of their opening movement, while the two beveled surfaces $e'$ and $d'$ are in engagement will be rapid. They will be rapidly closed when collar E moves forward by the engagement of these same beveled surfaces. Their complete closing upon work, however, will be slower because of the lesser incline of the engaging surfaces $d$ and $e$.

For convenience in operating the described device, the valve handle $x$ for controlling the admission and escape of air may be placed directly in front of the operator. This valve is in a casing W which is connected on one side with the supply pipe O' which in turn is connected with the inlet pipe O. On the other side this valve casing is connected by a pipe $O^2$ with a source of compressed air. The pipe $O^2$ communicates with the downwardly extended port $w^2$ in said casing, while the pipe O' communicates with the downwardly extended port $w'$ in said casing. The valve Z has through it the ports $z'$, $z^2$. This valve is forced by a spring $z^4$ up against the bottom of the valve casing, which valve casing has in addition to the port $w'$ and $w^2$ the relief port $w$. When the valve is turned into one position air entering the pipe $O^2$ passes down through port $w^2$ through the port $z^2$ to the open space below the valve and thence out through ports $z'$ and port $w'$ into the pipe O'. In the valve Z is a recess $z^3$ elongated so that by turning the valve it may establish communication between the port $w'$ and the relief port $w$. The valve stem Z passes out of the top of the casing and has the handle $x$ connected with it.

It is to be understood that any suitable valve mechanism may be employed to regulate and control the flow of air to and from the piston chamber $k$. It is to be noted that the tubes H and H' are in effect one element, which is divided into two parts primarily for convenience of construction.

It should perhaps be stated that because of the difference in the diameter of the two pistons M and M', the former will move first when air is admitted to the space between them and thereby the chuck jaws will be closed before the clutch is set to connect the live spindle with the driving pulley R; but when the air is allowed to escape from between the two pistons, the smaller piston will be moved by the spring Y to release the clutch, before the larger piston is moved, by the spring I in the direction to cause the opening of the chuck jaws.

Having described my invention, I claim:

1. In a chuck mechanism, the combination of a live spindle, a hollow head secured thereto, a plurality of chuck jaws pivoted at one of their ends upon said head, a closing ring supported by the live spindle and movable longitudinally thereon, means for moving said ring toward the free ends of the jaws to move them inwardly, an actuating member operatively connected to said ring, means for moving said member toward the free ends of the jaws, a releasing device adapted to move said jaws outwardly, and means for simultaneously retracting said ring from the jaws and causing said releasing device to move the jaws outwardly.

2. In chuck mechanism, the combination of a live spindle, chuck jaws pivoted thereto, a closing ring embracing said chuck jaws, said ring being supported by the live spindle by means which compel them to rotate in unison, but which permit the movement of said ring longitudinally of said spindle, said jaws having near their front ends external beveled surfaces and behind said surfaces other beveled surfaces at a greater inclination to the axis, the ring having corresponding beveled surfaces which engage the beveled surfaces on the jaws successively, and mechanism for moving said ring lengthwise of said spindle.

3. In chuck mechanism, the combination of a live spindle, chuck jaws pivoted thereto, a closing ring supported by the live spindle and movable longitudinally but not otherwise thereon, which ring embraces the chuck jaws and has a beveled surface for engagement therewith, a member supported by and movable longitudinally in the live spindle, which member is swiveled to said ring, and means for moving said member longitudinally in both directions in said live spindle.

4. In chuck mechanism, the combination of a live spindle, chuck jaws pivoted thereto, a closing ring supported by the live spindle and movable longitudinally but not otherwise thereon, which ring embraces the chuck jaws and has a beveled surface for engagement therewith, a tubular member supported by and movable longitudinally in the live spindle, which member is connected with said ring, a member supported by and movable longitudinally in said tubular member, a plug in the rear end of said tubular member, a spring compressed between said plug and the member in said tubular member, said jaws having inwardly directed arms with which the front end of said latter member engages, and means for moving said tubular member forward in the live spindle.

5. In chuck mechanism, the combination of a live spindle, chuck jaws pivoted thereto, a closing ring supported by the live spindle and movable longitudinally but not otherwise thereon, which ring embraces the chuck jaws and has a beveled surface for engagement therewith, a tubular member supported by and movable longitudinally in the live spindle, which member is connected with said ring, a member supported by and movable longitudinally in said tubular member, a plug in the rear end of said tubular member, a spring compressed between said plug and the member in said tubular member, said jaws having inwardly directed arms with which the front end of said latter member engages, a tubular member H' in the live spindle behind and in engagement with the tubular member first mentioned, a rod N movable longitudinally in said tubular member, said tubular member H' and live spindle being slotted, a pin connected with said rod and passing through said slots, a clutch member connected with said rod, a pulley loosely mounted on the tubular live spindle and adapted to be engaged by said clutch member, and means for moving the member H' and the rod N in opposite directions.

6. In chuck mechanism, the combination of a live spindle having a head, chuck jaws pivoted to said head and having beveled external surfaces, a closing ring movable longitudinally in said head and having a tongue and groove connection therewith and having a beveled surface for engagement with the beveled surface on the chuck jaws, a tubular member movable longitudinally in the live spindle and projecting into said head, means connecting said tubular member with said ring, a plug closing the rear end of said tubular member, a member movable longitudinally in said tubular member and projecting from the front end thereof and engaging with said chuck jaws, and a spring in said tubular member between said plug and the jaw opening member.

7. The combination of a tubular live spindle having an enlarged head at one end and having at its other end a piston chamber, chuck jaws in said head, a tube extending through the live spindle and projecting into the enlarged head and into said piston chamber, means in said head operated by said tube for closing the chuck jaws, a piston in the piston chamber connected with said tube, a rod extending through the piston and forward part way through said tube, a piston secured to the rear end of said rod, a pulley rotatably mounted upon the live spindle carrying a clutch surface, a clutch movable longitudinally but not otherwise upon said live spindle and having a coöperating clutch surface, a pin connecting said rod and clutch sleeve,—the tube and live spindle having slots through which said pin projects, and valve controlled means for admitting air to and from the piston chamber between the two pistons.

8. The combination of a tubular live spindle having an enlarged head at one end and having at its other end a piston chamber, chuck jaws in said head, a tube extending through the live spindle and projecting into the enlarged head and into said piston chamber, means in said head operated by said tube for closing the chuck jaws, a piston in the piston chamber connected with said tube, a rod extending through the piston and forward part way through said tube, a piston secured to the rear end of said rod, a pulley rotatably mounted upon the live spindle carrying a clutch surface, a clutch sleeve movable longitudinally but not otherwise upon said live spindle and having a coöperating clutch surface, a pin connecting said rod, and clutch sleeve,—the said tube and the live spindle having slots through which said pin projects, and a fixed braking surface adapted to engage with the front end of said clutch sleeve, and valve controlled means for admitting air to and from the piston chamber between the two pistons.

9. The combination of a tubular live spindle, chuck mechanism carried by its front end, a piston chamber fixed to its rear end, a pulley rotatably mounted upon the live spindle and having a clutch surface, a longitudinally movable clutch sleeve mounted on the live spindle and having a coöperating clutch surface, a fixed braking surface, mechanism for closing chuck jaws, means for opening the chuck jaws, two pistons movable in said piston chamber, mechanism intermediate of said pistons and the other mechanism specified whereby compressed air admitted to the chamber between the pistons will move them in opposite directions and they will operate the clutch closing mechanism and the clutch sleeve to connect the pulley with the live spindle, and springs which, when air is released from the piston chamber, will move said pistons in opposite directions and will thereby move the clutch sleeve out of engagement with the pulley and into engagement with the braking surface and will also operate the chuck releasing mechanism.

10. The combination of a tubular live spindle, chuck mechanism carried by its front end, a piston chamber which is fixed to its rear end and has two concentric portions of different diameters, a pulley rotatably mounted upon the live spindle and having a clutch surface, a longitudinally movable clutch sleeve having a tongue and groove connection with the live spindle and having a coöperating clutch surface, means for closing said chuck mechanism, two pistons of different diameters respectively fitted in the two parts of the piston chamber, means for transmitting motion from the larger of said pistons to the chuck closing mechanism, means for transmitting motion from the smaller piston to the longitudinally movable clutch sleeve, and means for admitting compressed air to the piston chamber between said two pistons, whereby, because of the different diameters of the pistons, the two pistons will move one before the other, according to whether air is forced into or allowed to escape from the space between the two pistons, substantially as specified.

11. In chuck mechanism, the combination of a power pulley, a rotatable spindle adapted to be clutched to the said pulley, chuck jaws pivotally supported by said spindle, a ring surrounding the live spindle and longitudinally movable thereon, said ring being adapted to engage the jaws to close the same, means for moving the ring to cause the jaws to close and subsequently clutching the said spindle to the power pulley.

In testimony whereof, I hereunto affix my signature in the presence of two witnesses.

HORACE W. THOMPSON.

Witnesses:
H. R. SULLIVAN,
A. F. KWIS.